J. Q. DAUGHERTY.
NUT LOCK.
APPLICATION FILED APR. 23, 1920.
1,346,301. Patented July 13, 1920
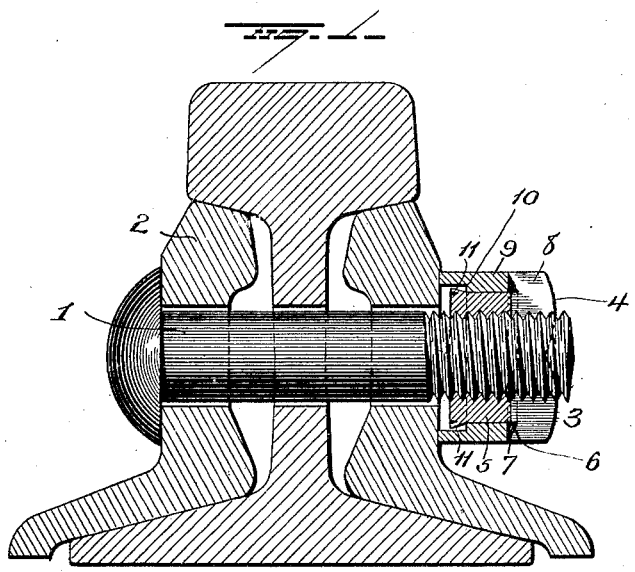
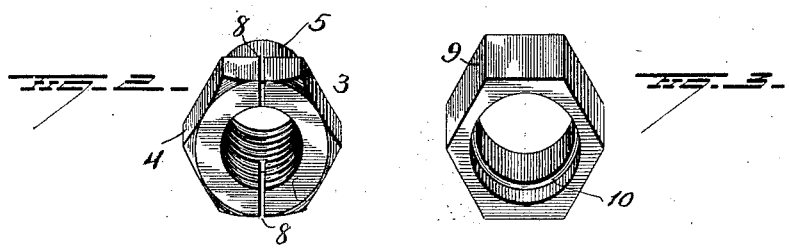
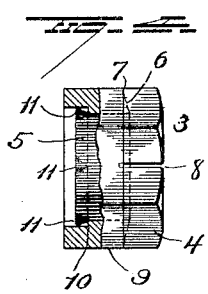
Inventor
J. Q. Daugherty
By Seymour & Bright
Attorneys

UNITED STATES PATENT OFFICE.

JOHN Q. DAUGHERTY, OF BROKEN ARROW, OKLAHOMA, ASSIGNOR OF ONE-FOURTH TO KNOX M. ROWE, OF BROKEN ARROW, OKLAHOMA.

NUT-LOCK.

1,346,301.  Specification of Letters Patent.  Patented July 13, 1920.

Application filed April 23, 1920. Serial No. 376,021.

*To all whom it may concern:*

Be it known that I, JOHN Q. DAUGHERTY, a citizen of the United States, and a resident of Broken Arrow, in the county of Tulsa and State of Oklahoma, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks and more particularly to such as embody two members which bear such co-operative relation to each other that one of said members will be clamped to the bolt on which it is screwed,—one object of the invention being to provide a construction of the type specified which shall be simple; comparatively cheap to manufacture; easy of application; which may be operated to tightly clamp the bolt; which may be readily removed when desired but which will operate to prevent loosening of the nut on account of vibration or from other cause.

With this and other objects in view, the invention consists in certain novel features of construction and combinations of parts as hereinafter set forth and pointed out in the claims.

In the accompanying drawings; Figure 1 is a view showing the application of my invention; Figs. 2 and 3 are separate views of the respective members of the device, and Fig. 4 is a sectional view with the parts assembled.

1 represents a bolt and 2 parts through which the bolt passes,—the latter being provided at one end with a head to bear against one of said parts and the projecting portion of said bolt being threaded to receive a nut 3. In the present instance, the nut is formed with an angular head 4 and a tubular body portion 5, the latter having a smooth exterior surface, and said nut is threaded interiorly from end to end. The head 4 of the nut is undercut or beveled as at 6, whereby a peripheral edge 7 is formed, and said head is split transversely as at 8, the split portions being located at both sides of the bore of the nut.

A ring 9 receives freely the tubular body portion 5 of the nut, said ring being disposed between one of the parts 2 through which the bolt passes and the angular head 4 and it may have an angular exterior configuration conforming to that of the head 4 of the nut. The inner end portion of the bore of the ring is slightly enlarged whereby an annular shoulder 10 is formed. While the nut is capable of turning freely with relation to the ring 9, still it is desirable to prevent the separation of these parts from each other and to accomplish this, the metal at the inner end of the body portion of the nut may be upset (with the use of a suitable tool) so as to form tits 11 overlying the shoulder 10 in the ring.

When the devices are applied to a bolt and the nut screwed down, the ring will become clamped between the head of the nut and the part through which the bolt passed. By the application of sufficient turning power to the nut, the outer edge 7 of head 4 (formed by the under-cutting or beveling of said head) will be so forced against the end of the ring, near the outer edge of the latter, as to apply leverage to the split head of the nut and crowd the same against the threaded bolt in a manner to so clamp the nut to the bolt, (without injuring the threads thereof) as to prevent the unscrewing of the nut on account of vibration to which the parts may be subjected,—such vibration, for example, as caused by the travel of a train over rails, the sections of which are connected by fish-plates bolted thereto. The nut may be readily removed however by the application of sufficient turning power to relieve the clamping of the nut to the threaded bolt.

Having fully described my invention what I claim as new and desire to secure by Letters-Patent, is:—

1. The combination of a split nut having a tubular body portion and a head having an undercut inner end portion, and a ring into which said tubular portion of the nut is freely movable and against one end of which, the edge of the nut formed by said undercut portion bears.

2. The combination of a split nut having a tubular body portion and a head having an undercut inner end portion, and a ring in which said tubular body portion of the nut is freely movable and against one end of which, the edge of the nut formed by the undercut portion bears, said ring having an internal shoulder and the tubular portion of the nut having a tit overlying said shoulder to prevent separation of the nut and ring.

In testimony whereof, I have signed this specification in the presence of two subscribing witnesses.

JOHN Q. DAUGHERTY.

Witnesses:
C. E. LAWS,
L. A. WALLINGFORD.